United States Patent Office 3,129,686
Patented Apr. 21, 1964

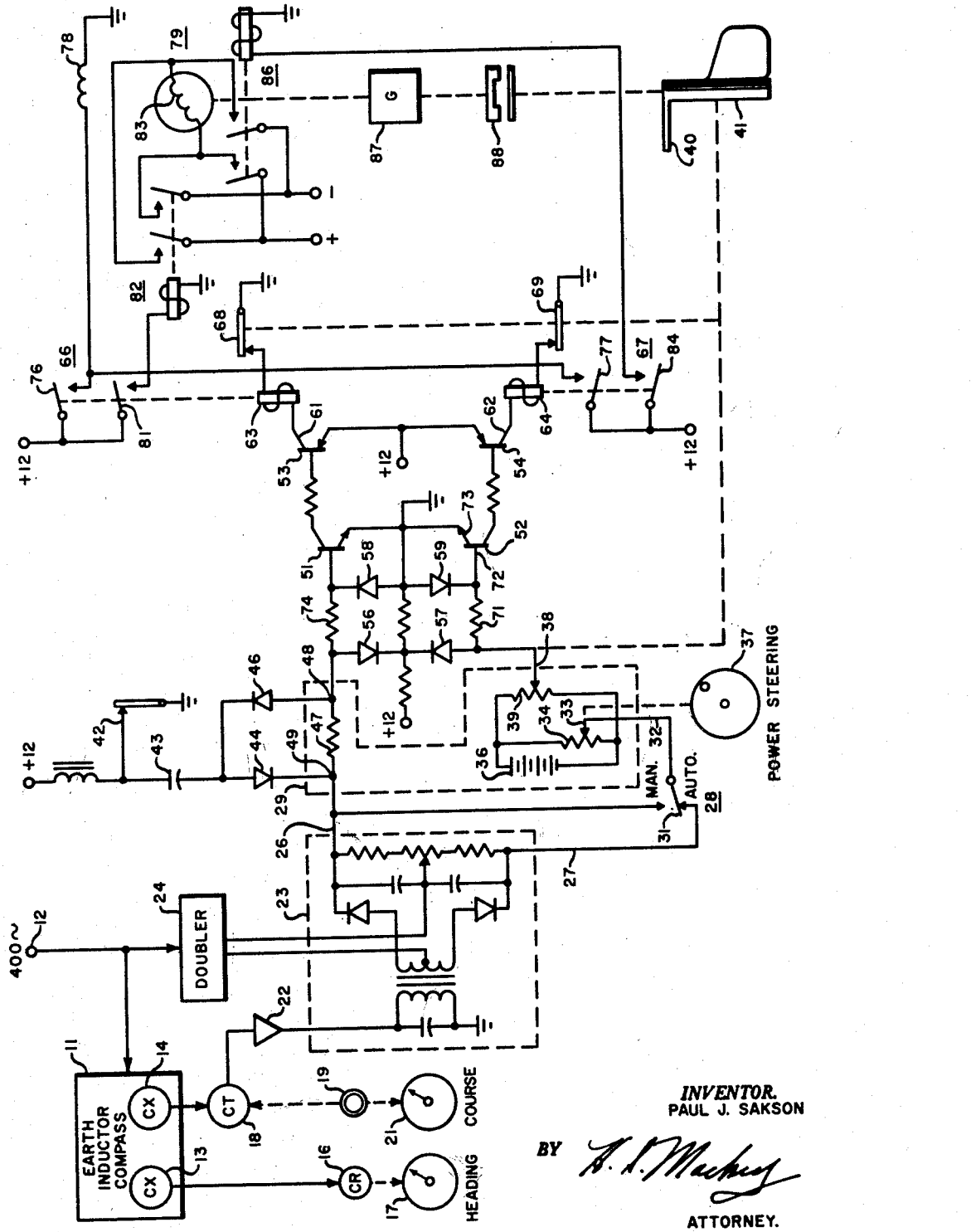

3,129,686
MARINE AUTOPILOT
Paul J. Sakson, Yorktown Heights, N.Y., assignor to General Precision, Inc., a corporation of Delaware
Filed July 19, 1962, Ser. No. 210,909
3 Claims. (Cl. 114—144)

This invention relates to automatic pilot systems and particularly to systems suitable for small marine craft.

An object of this invention is to provide a simple autopilot for steering an aircraft, small boat, or other navigable vehicle.

Another object is to provide an autopilot employing electrical negative feedback for proportional control of the autopilot steering function.

Another object is to provide an autopilot which is corrected for the steering bias caused by the use of a single propeller.

Another object is to provide an autopilot which can be operated manually with power steering.

The system of this invention employs a compass emitting an electrical signal representing boat heading. The emitted signal is applied to a control element set to the desired course to produce an error signal having phase sense and magnitude representing the divergence of the heading from the desired course. This signal is employed to form a correction signal which, through relays and a motor, turns the rudder.

The rudder produces a rudder angle signal which is fed back to tend to neutralize the correction signal, thus exerting proportional control and stabilizing the system.

Provision is made for manual trimming of the rudder and, by throwing a switch, for manual piloting with power steering.

Provision is also made for automatic neutralization of the rudder bias caused by the use of a single propeller.

A further understanding of the invention may be secured from the detailed description taken together with the drawing, the single FIGURE of which illustrates a circuit embodying the invention.

Referring now to the drawing, a compass of any type having an electrical output signal is installed on a small marine craft. The compass, if magnetic, is preferably installed well away from large masses of iron or steel so as to measure the direction of the undistorted magnetic field of the earth. As an example, a three-phase earth inductor compass 11 is employed in this embodiment. The compass is energized from a 400 c.p.s. source terminal 12 and is provided with two synchro transmitters, 13 and 14, which emit three-phase, 800 c.p.s. signals representing the direction of magnetic north relative to the longitudinal axis of the boat. The synchro transmitter 13 is connected to a remote synchro receiver 16 having a dial 17 which indicates the magnetic heading. The synchro transmitter 14 is connected to a control transformer 18, the shaft of which is set manually by a desired course setting knob 19, which also turns a dial 21 to indicate the position of the knob and control transmitter. This knob is provided to set in the desired course azimuth angle. The output from the control transformer 18 is an alternating signal having phase and magnitude representing the angular difference between the desired course and the heading. This signal is amplified by the amplifier 22, and is then synchronously rectified by a rectifier 23 referred, by means of a frequency doubler 24, to the 400 c.p.s. source terminal 12. The output potential between conductors 26 and 27 is a direct current error signal having sense and amplitude representing the angle between desired course and present heading.

The conductors 26 and 27 are connected through a switch 28 to a circuit 29 for algebraic series addition of the several signals applied to it. A second input signal is secured by connecting the switch arm 31 through conductor 32 to the slider 33 of a potentiometer 34 which is energized from an ungrounded 12-volt battery 36. The slider 33 is manually positioned by a handwheel 37. A third adder input is taken from the slider 38 of a potentiometer 39 also energized from battery 36. This slider 38 is connected to the rudder post 41 and is moved by the rudder movement. The slider 38 also constitutes one electrical output terminal of the algebraic adder.

A fourth adder input signal represents the speed of the engine. This signal current is generated by a circuit including the contact point 42 of a timer which is vibrated at the engine speed. This timer contact point is connected to a capacitor 43 and two diodes 44 and 46. The other diode terminals are connected across a resistor 47 which is a series component of the adder. The resistor terminal 48 constitutes one adder output terminal.

In the operation of this fourth adder input circuit, a sawtooth potential is generated by the vibrations of the timer at the frequency representing the engine speed. When the sawtooth waveform applied to capacitor 43 is rising, the resulting positive charge coupled through the capacitor 43 passes through the diode 44. During the more rapid downgoing portion of the waveform the negative charge coupled through the capacitor 43 makes the diode 46 conductive and draws current from the terminal 48. The net result is a current passing through resistor 47 which generates a proportional potential difference between the terminals 49 and 48. This potential is always positive and is the same in each cycle, because it represents the charge applied to the capacitor 43. The magnitude of this potential is therefore proportional to timer frequency, to engine speed and approximately to boat speed.

The output of the algebraic adder consists of a direct-current error potential between the terminal 48 and the slider 38. This potential is applied to an amplifier comprising transistors 51, 52, 53 and 54, and diodes 56, 57, 58 and 59. The collectors 61 and 62 constitute the amplifier outputs. They are connected to ground through the coils 63 and 64 of two relays 66 and 67 and two limit switches 68 and 69. The diodes 56 and 57 protect the transistors by limiting the input signal to about three volts. The diodes 58 and 59 protect the transistor emitters and provide return paths for the input signals.

In the operation of this amplifier, when the slider 38 is positive and terminal 48 negative, current flows through a resistor 71, base 72, emitter 73, diode 58 and resistor 74. Thus transistors 52 and 54 become conductive, operating relay 67, and transistors 51 and 53 are nonconductive. When the slider 38 is negative and terminal 48 positive, relay 66 is operated and transistors 52 and 54 are nonconductive. The relay contacts 76 and 77 apply +12-volt excitation to the shunt field 78 of a shunt motor 79. Contacts 81, through a contactor 82, apply power in a selected polarity to the armature winding 83 of the motor 79, and contacts 84, through a contactor 86, apply power in reverse polarity to the armature winding 83. The motor 79, through a step-down gear 87 and a clutch 88, is connected to turn the rudder post 41. Limit switches 68 and 69 are provided, operated by rotation of the rudder post, to open the coils of relays 66 and 67 at the limits of rudder angle.

In the operation of this circuit, the earth inductor compass emits an 800 c.p.s. signal representing the angle between the boat's heading direction and north direction. The remote indicator 17 indicates this heading angle. The compass also transmits a similar signal to the control transformer 18 which, when its shaft is at an angle representing the above angle, emits no signal. However, at any other shaft angle the control transformer 18 emits an 800 c.p.s. error signal representing the departure of its shaft angle from the above heading angle. This signal, after conversion to direct current by the synchronous rectifier 23, is applied through switch 28 to the algebraic adder 29. Here one or more of three additional signals is inserted. The handwheel 37, controlling slider 33, inserts potential adding to or subtracting from the error signal input to trim the rudder position. When the switch 28 is moved to its "manual" position, cutting off the error signal input from conductor 27, the handwheel 37 becomes the principal control and the boat may be power steered by means of this handwheel.

The signal applied through slider 38 from the rudder post 41 has a magnitude proportional to the rudder angle and is therefore termed proportional control. When approaching the desired course, this signal has a polarity opposite to that of the error signal. It provides the required steering stability and causes the craft to approach the desired course exponentially. Without this control the steering tract is likely to hunt about the desired course direction, the boat therefore following a sinuous path.

It is generally recognized that the propeller blades exert more force at the bottom of their rotation circle than they do at the top. This difference in force is caused by the difference in hydrostatic pressure of the water at the top and bottom levels. When a boat has a single propeller, it thus has a tendency to move the stern of the boat toward one side, necessitating the introduction of a small counteracting rudder angle to steer a straight course. This effect is directly proportional to the speed of rotation of the propeller.

The counteracting signal is generated from the timer circuit as has been described, and constitutes a potential applied to the algebraic adder 29 from the diodes 44 and 46 of such polarity and magnitude as to neutralize this turning tendency at all speeds.

The corrected signal from the algebraic adder 29 constitutes a direct-current correction signal representing by its polarity the direction of the correction which is to be applied to the rudder. This signal is amplified in the following amplifier and produces current in either collector 61 or collector 62, depending on the polarity of the signal applied to the amplifier, but never excites collectors 61 and 62 simultaneously. The collector which is excited energizes one of the relay coils, for example, coil 63. When the rudder is within its limits of motion, both limit switches 68 and 69 remain closed. When relay 66 operates, the field coil 78 is energized and current is applied to the armature coil 83 of motor 79 in such direction as, through changing the boat's heading, to reduce the error signal produced by the control transformer 18. When the error signal becomes zero and the rudder position is stabilized, the motor 79 becomes stationary and the rudder stays in its attained position.

In moving the rudder a telltale signal is generated at the potentiometer slider 38, proportional in magnitude to the rudder deflection and having a sense representing the sense, referred to the center or neutral position, of the rudder deflection. This proportional signal is fed back negatively, through the algebraic adder, principally to stabilize the dynamic loop.

The boat can be steered manually, without power steering, by opening the clutch 88 and steering with the tiller 40 or the like connected directly to the rudder post 41.

What is claimed is:
1. An autopilot for a vehicle including a propulsion engine and a rudder comprising,
  compass means for determining the direction of north relative to the longitudinal axis of said vehicle,
  means developing a heading angle signal from said compass means,
  means for generating a course angle signal,
  means for subtracting said heading and course signals to generate an error signal,
  a motor connected to said rudder to steer the vehicle,
  means applying said correction signal to said motor,
  means deriving a telltale signal from the position of said rudder having an amplitude and sense directly representing the amplitude and sense of rudder angle,
  means combining said telltale signal with said correction signal,
  an engine timer operated by said engine at a rate proportional to the speed thereof,
  means for deriving a signal from said engine timer having an amplitude proportional to the speed of said motor.
  and means combining said signal with said correction signal.

2. A marine autopilot for a vehicle including a propulsion engine and a rudder comprising,
  compass means for determining the north direction relative to vehicle heading and deriving a heading angle signal therefrom,
  means for setting a desired course angle and for deriving a desired course angle signal therefrom and representative thereof,
  means for algebraically subtracting said heading angle signal and said desired course angle signal to derive an error signal representing the algebraic difference thereof,
  means including an algebraic adding circuit for deriving a correction signal from said error signal,
  an electric motor,
  relay means for operating said electric motor in either direction,
  means applying said correction signal to said relay means,
  mechanical means connecting said motor to move said rudder and thereby steer said vehicle,
  means deriving a telltale signal from the position of said rudder, said telltale signal having an amplitude representing the rudder angle amplitude and having a sense representing the rudder angle sense relative to its center position,
  means combining said telltale signal with said correction signal,
  an engine timer operated by said engine at a rate proportional to the speed thereof,
  means for deriving an alternating-current signal from said engine timer having a frequency linearly proportional to engine speed,
  means for converting said alternating current signal to a direct-current signal having an amplitude proportional to said frequency,
  and means applying said direct-current signal to said algebraic adding circuit.

3. A marine autopilot for a boat including a propulsion engine and a rudder comprising,
  a remote-indicating magnetic compass emitting a heading signal representing magnetic heading angle,
  means for setting a desired course angle and for producing a course signal representative thereof,
  means for subtracting said heading and course signals to generate an error signal representing the algebraic difference thereof,
  an algebraic adder having said error signal applied thereto and generating a correction signal,
  an electric motor,
  relays connected to operate said electric motor selectively in either direction,
  mechanical means connecting the shaft of said electric motor to move said rudder for the purpose of steering said boat,
  means applying said correction signal to a selected one of said relays,
  means deriving a telltale signal from the angular position of said rudder, said telltale signal having a sense and amplitude representing the rudder angle sense relative to center position and representing the rudder angular magnitude, means applying said telltale signal to said algebraic adder for algebraic addition to said error signal,
an engine timer operated by said engine at a rate proportional to the speed thereof,
means including a capacitor and a diode for deriving a direct-current signal from said engine timer having current amplitude linearly representative of the speed of said engine and approximately the boat speed,
and means applying said direct-current signal to said algebraic adder.

References Cited in the file of this patent

UNITED STATES PATENTS

| | | |
|---|---|---|
| 2,257,203 | Thacker | Sept. 30, 1941 |
| 2,668,514 | Nichols | Feb. 9, 1954 |
| 2,841,754 | Jones | July 1, 1958 |
| 2,945,170 | Jones | July 12, 1960 |